Sept. 27, 1927.
J. LEDWINKA
1,643,739
AUTOMOBILE BODY AND METHOD OF MAKING SAME
Filed Dec. 27, 1920         9 Sheets-Sheet 8
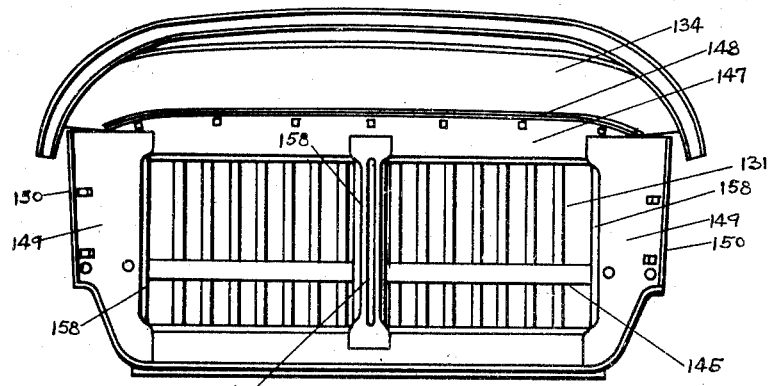
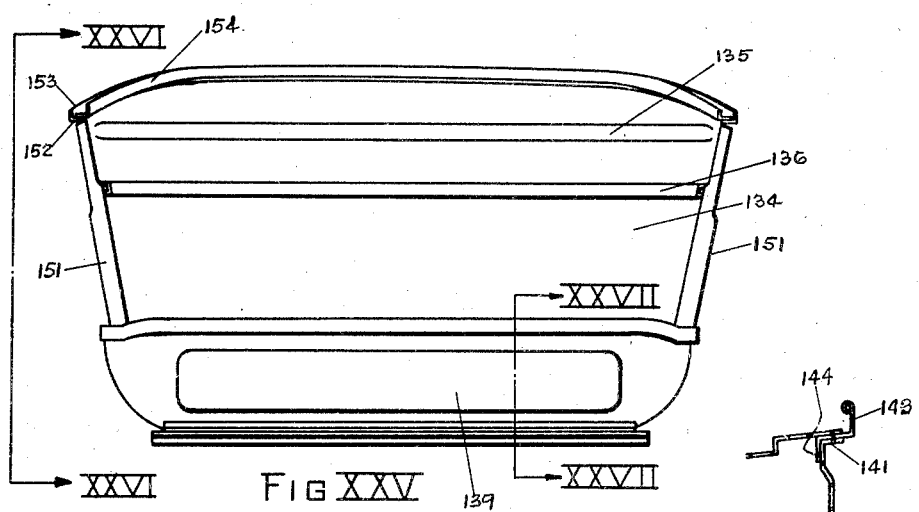
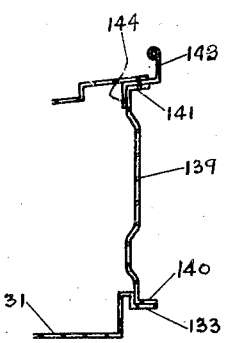
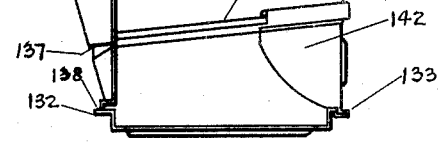

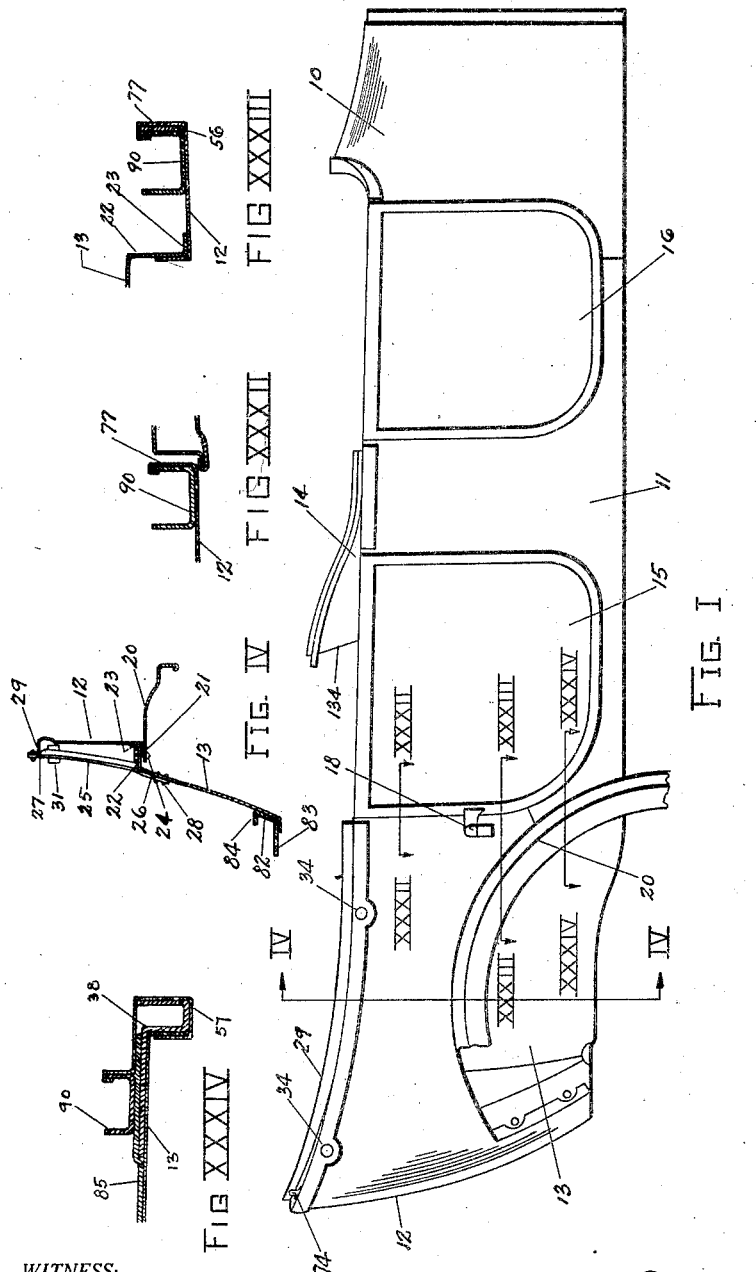

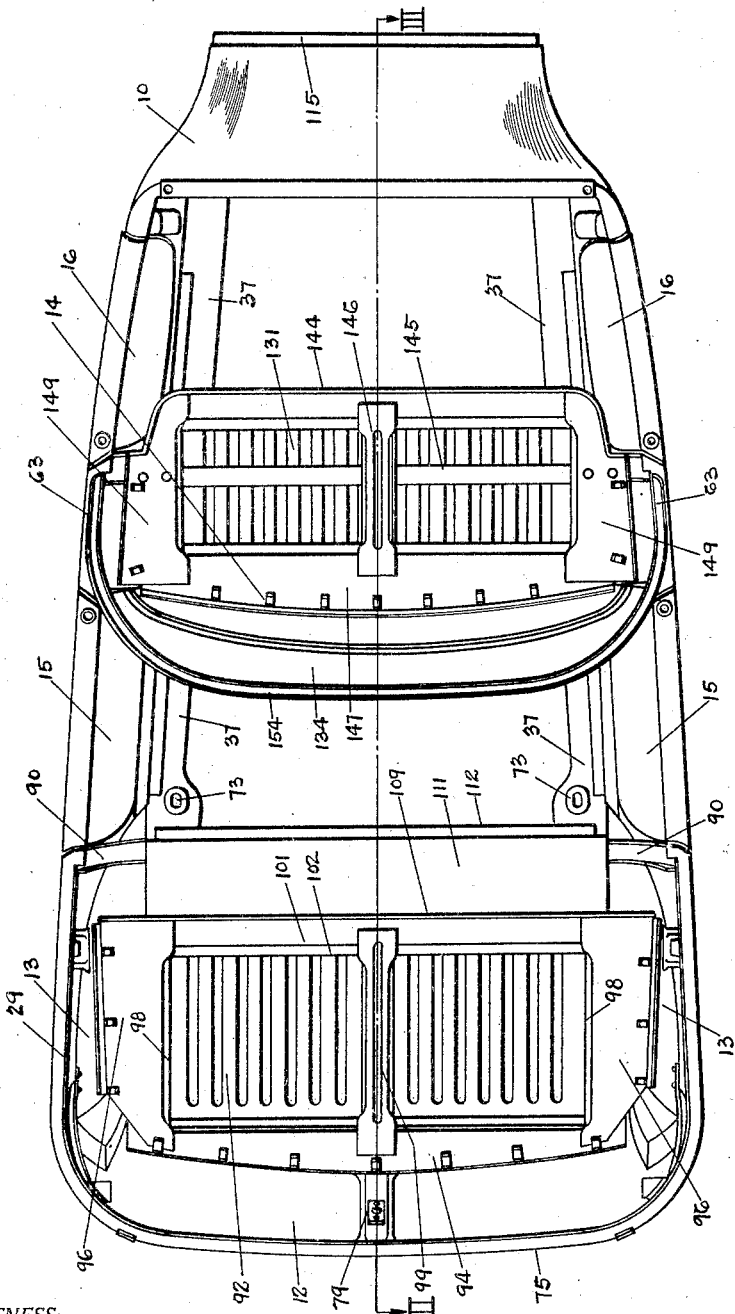

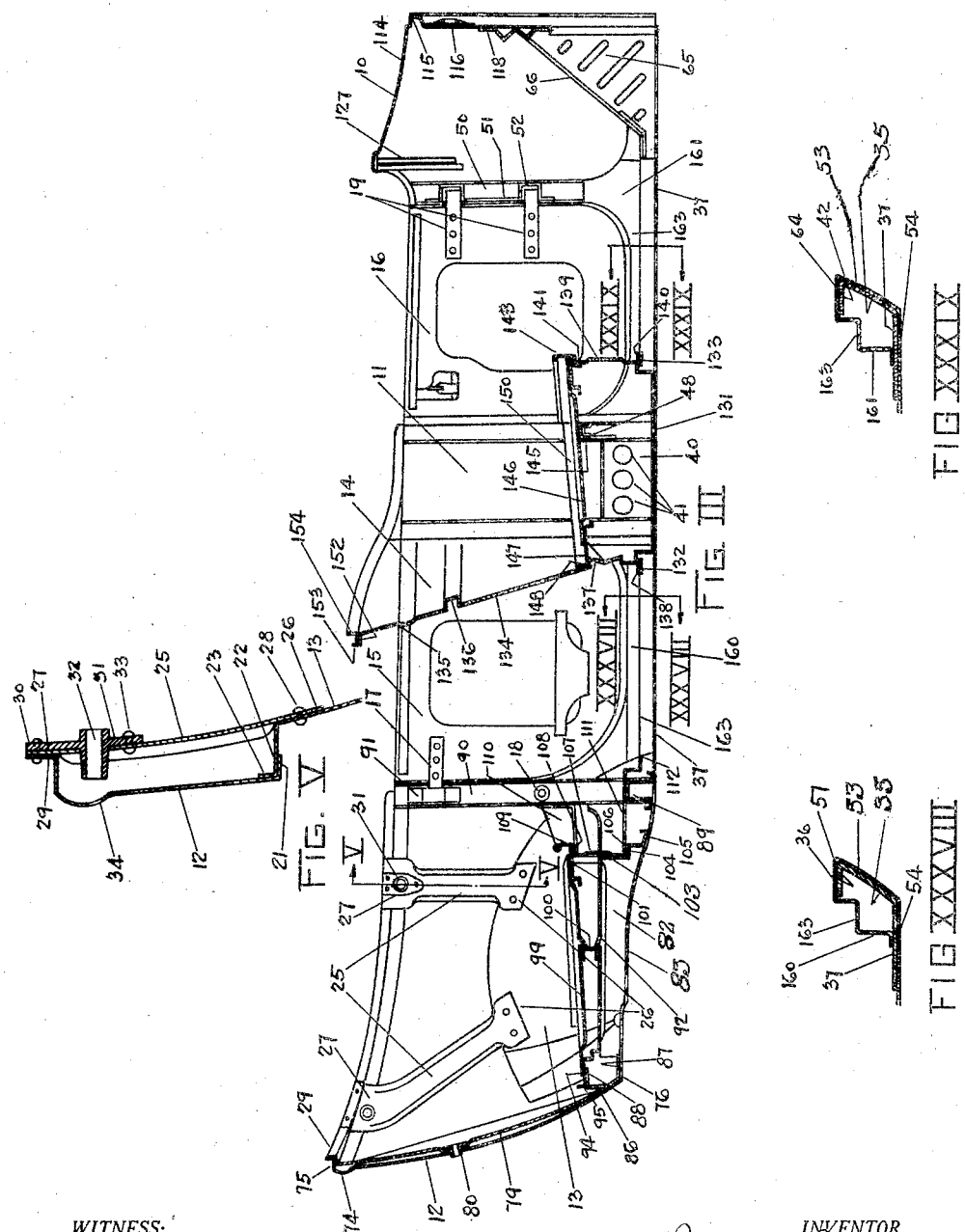

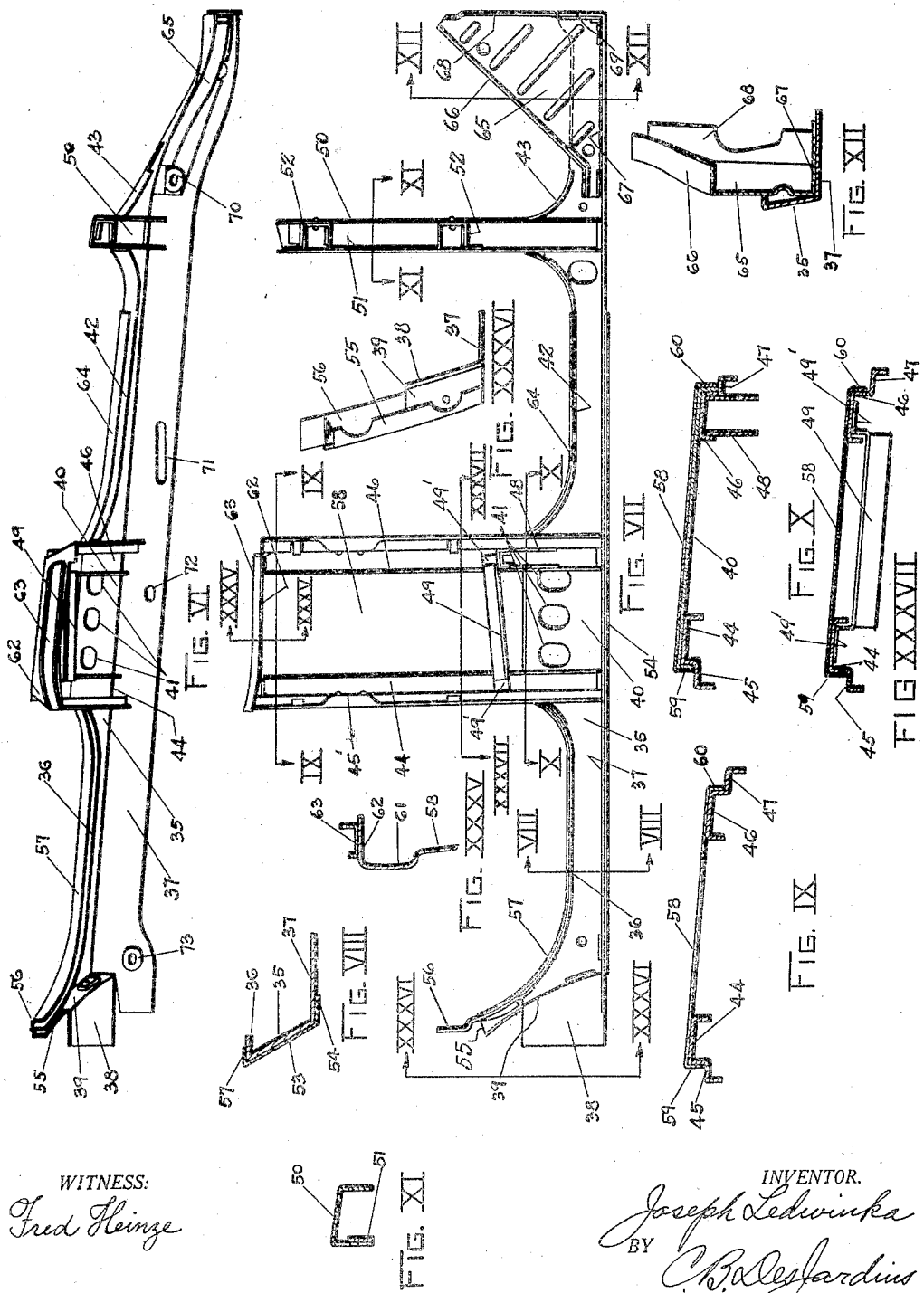

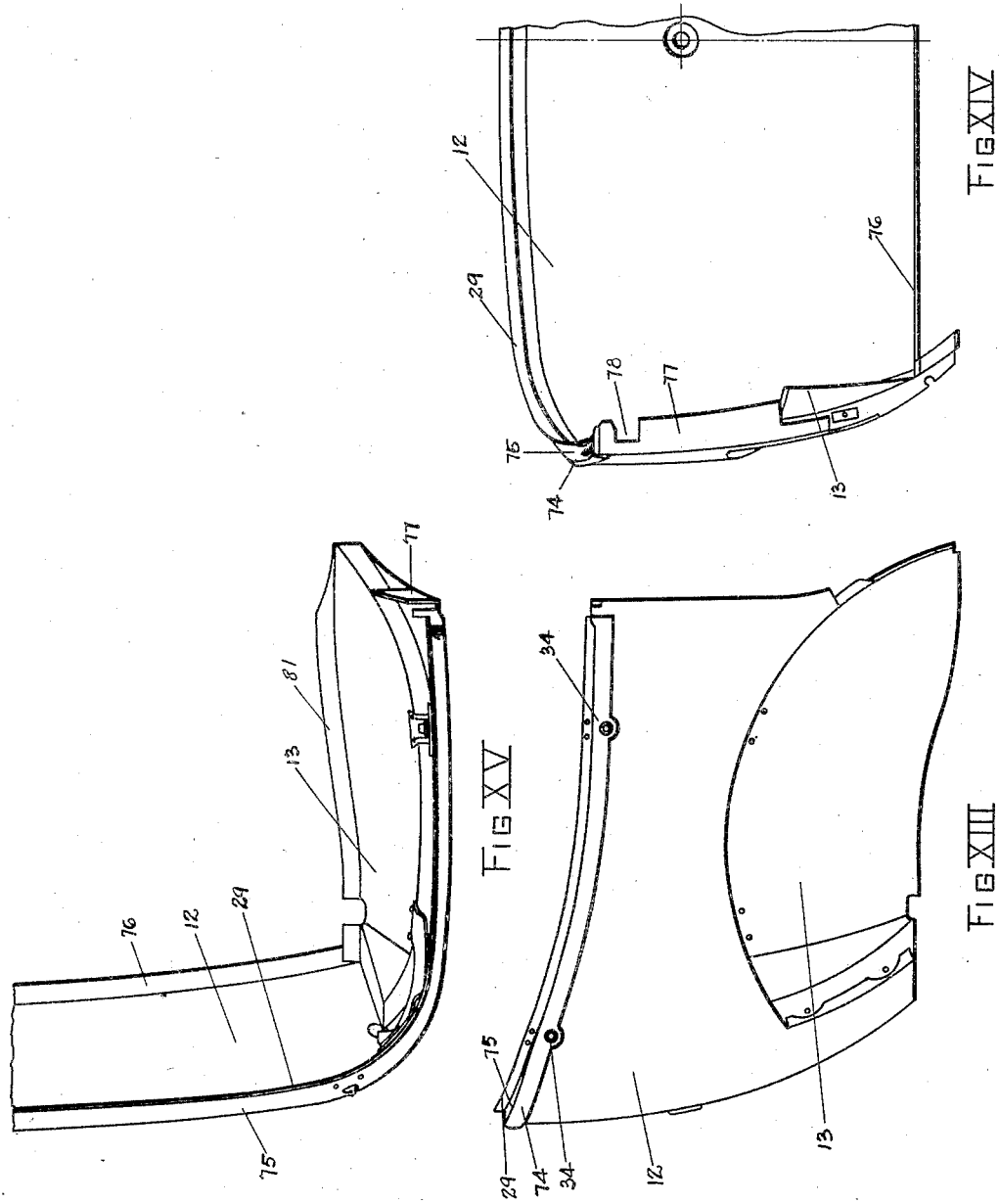

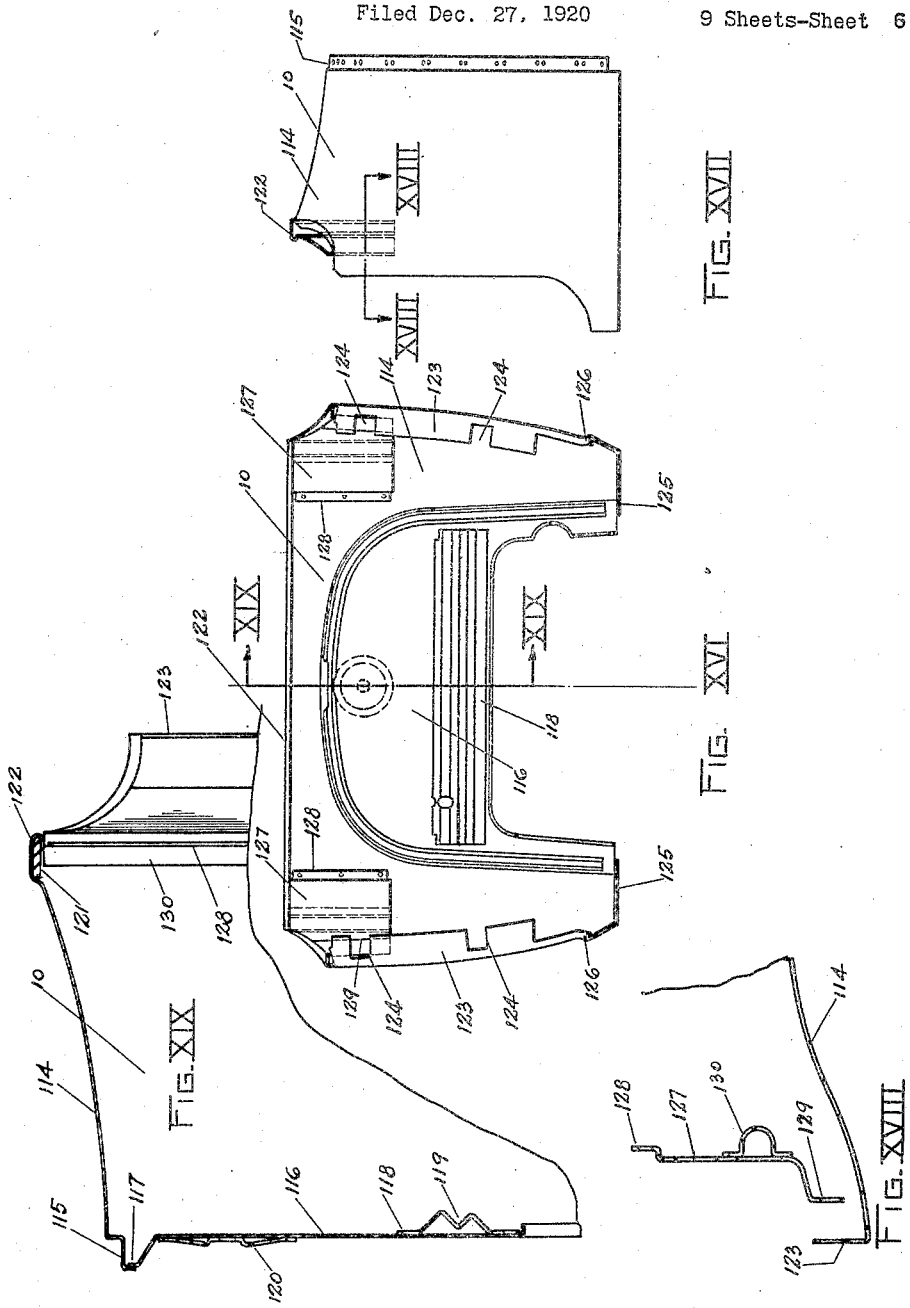

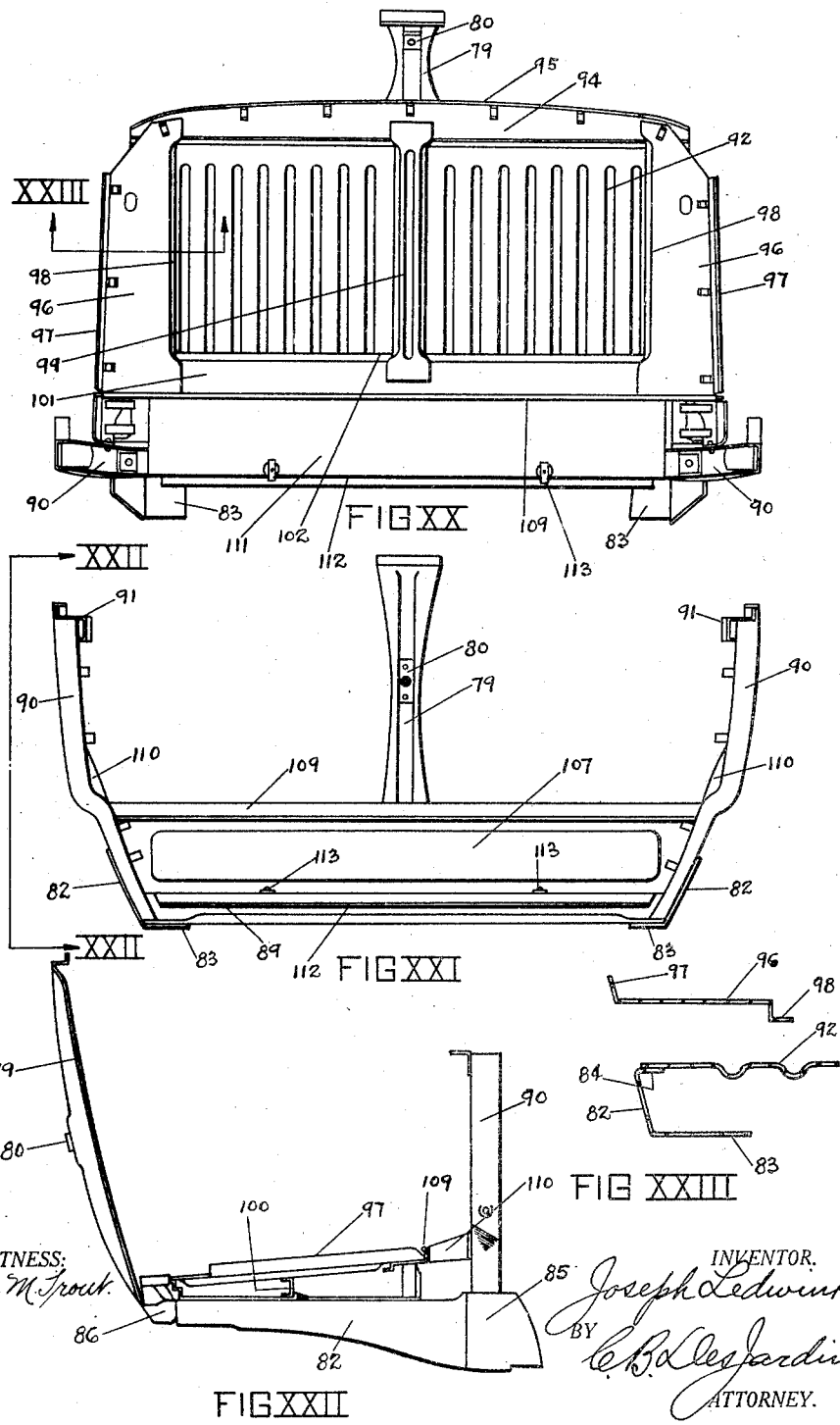

Sept. 27, 1927.
J. LEDWINKA
1,643,739
AUTOMOBILE BODY AND METHOD OF MAKING SAME
Filed Dec. 27, 1920     9 Sheets-Sheet 9
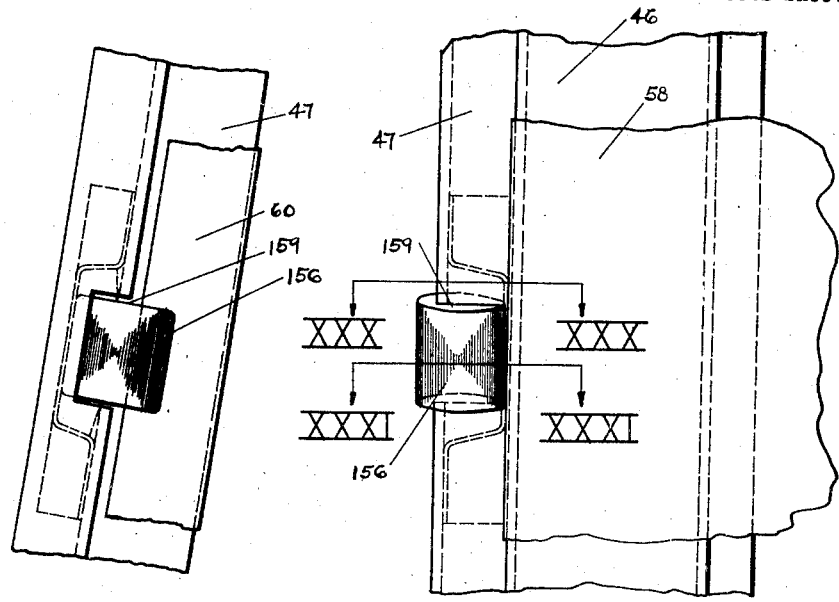
Fig XXVIII
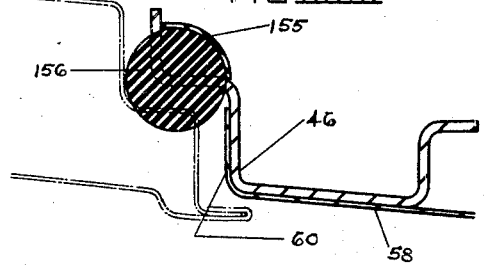
Fig XXIX
Fig XXXI
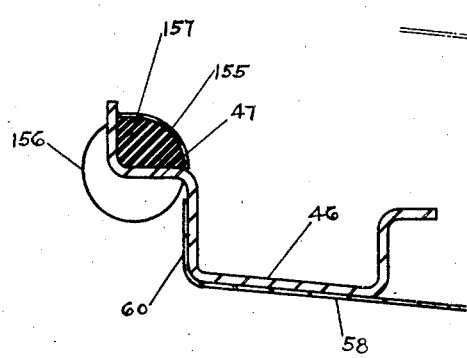
Fig XXX
WITNESS:
INVENTOR.
Joseph Ledwinka
BY
ATTORNEY.

Patented Sept. 27, 1927.

1,643,739

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

AUTOMOBILE BODY AND METHOD OF MAKING SAME.

Application filed December 27, 1920. Serial No. 433,379.

My invention relates to improvements in automobile bodies and the method of making same. My invention has to do primarily with automobile bodies constructed entirely from metal so that all wooden parts may be eliminated.

One of the objects of my invention is to provide an automobile body of strong and durable construction which may be produced efficiently in mass production.

Another object of my invention is to provide an automobile body construction which comprises a number of assembly units, or sub-assemblies, suitably connected together in the final assembly of the body.

Another object of my invention is to provide an improved method of making automobile bodies involving the formation of assembly units, or sub-assemblies, and the connecting together of such sub-assemblies in the final assembly.

Another object of my invention is to provide a particularly staunch and strong tonneau construction in which means are provided for connecting the wheel housings and the tonneau panel, and for bracing such parts relative to each other.

A further object of my invention is to provide an automobile body having a particularly strong construction at the rear door posts and in which the rear door posts are efficiently braced and stayed.

Another object of my invention is to provide an automobile body having a strong and durable cowl construction and in which the forward ends of the body sills are connected by a suitably shaped cowl panel.

A further object of my invention is to provide, in connection with the door posts, improved means for preventing the rattling of the doors.

Further objects of my invention will definitely appear from the detailed description to follow.

I accomplish the objects of my invention, in one instance, by the devices and means described in the following specification. My invention is clearly defined and pointed out in the appended claims. A structure, constituting a preferred embodiment of my invention, is illustrated in the accompanying drawing, forming part of this specification, in which:

Fig. I is a view, in side elevation, of an automobile body embodying my invention, a part of the fender being broken away to show the tonneau construction.

Fig. II is a top plan view of the automobile body shown in Fig. I.

Fig. III is a longitudinal, sectional view, taken on the line III—III of Fig. II.

Fig. IV is a detail, sectional view through the side of the tonneau and the fender, taken on the line IV—IV of Fig. I.

Fig. V is an enlarged, detail, sectional view, taken on the line V—V of Fig. III and showing one of the braces connecting the tonneau panel and the wheel housing.

Fig. VI is a top plan view of the left hand side panel unit.

Fig. VII is a view of said unit in side elevation, looking towards the inside of the unit.

Fig. VIII is a detail, sectional view, taken on the line VIII—VIII of Fig. VII.

Fig. IX is a detail, sectional view, taken on the line IX—IX of Fig. VII.

Fig. X is a detail, sectional view, taken on the line X—X of Fig. VII.

Fig. XI is a detail, sectional view through the "A" door post, taken on the line XI—XI of Fig. VII.

Fig. XII is a detail, sectional view through the front end of the body sill and the toeboard support, taken on the line XII—XII of Fig. VII.

Fig. XIII is a view, in side elevation, of the tonneau unit.

Fig. XIV is a fragmentary view, in front elevation, of said unit.

Fig. XV is a fragmentary top plan view of said unit.

Fig. XVI is a view, in elevation, of the cowl unit, this view being taken looking from the rear of the cowl towards the front.

Fig. XVII is a view of the cowl unit in side elevation.

Fig. XVIII is a detail, sectional view, taken on the line XVIII—XVIII of Fig. XVII, and showing the edge of the cowl and the support for the instrument board.

Fig. XIX is a longitudinal, sectional view through the cowl unit, taken on the line XIX—XIX of Fig. XVI.

Fig. XX is a top plan view of the tonneau frame unit.

Fig. XXI is a view, in front elevation, of said unit.

Fig. XXII is a view in side elevation, of said unit taken on the line XXII—XXII of Fig. XXI.

Fig. XXIII is a detail, sectional view, taken on the line XXIII—XXIII of Fig. XX.

Fig. XXIV is a top plan view of the front seat unit.

Fig. XXV is a view in front elevation of said unit.

Fig. XXVI is a view in side elevation of said unit, taken on the line XXVI—XXVI of Fig. XXV.

Fig. XXVII is a detail, sectional view taken on the line XXVII—XXVII of Fig. XXV.

Fig. XXVIII is a detail edge view of a door post, showing the mounting of the buffer.

Fig. XXIX is a similar view in side elevation.

Fig. XXX is a detail, sectional view on the line XXX—XXX of Fig. XXIX.

Fig. XXXI is a detail, sectional view on the line XXXI—XXXI of Fig. XXIX.

Fig. XXXII is a detail, sectional view through the "D" door post, taken on the line XXXII—XXXII of Fig. I.

Fig. XXXIII is a detail, sectional view taken on the line XXXIII—XXXIII of Fig. I.

Fig. XXXIV is a detail, sectional view, taken on the line XXXIV—XXXIV of Fig. I, and showing the body construction adjacent the "D" door post.

Fig. XXXV is a detail, sectional view, taken on the line XXXV—XXXV of Fig. VII.

Fig. XXXVI is a view of the left side panel unit, in end elevation, taken on the line XXXVI—XXXVI of Fig. VII.

Fig. XXXVII is a detail, sectional view taken on the line XXXVII—XXXVII of Fig. VII.

Fig. XXXVIII is a detail, sectional view, taken on the line XXXVIII—XXXVIII of Fig. III, and Fig. XXXIX is a detail, sectional view, taken on the line XXXIX—XXXIX of Fig. III.

In the drawings, similar reference numerals refer to similar parts throughout the several views, and the sectional views are taken looking in the direction of the arrows at the ends of the section lines.

In the accompanying drawings, I have illustrated an automobile body constructed in accordance with and forming one embodiment of my invention. This automobile body also embodies the broad invention disclosed and claimed in my prior Letters Patent, No. 1,143,635, in that it includes a skeleton frame to take the stresses and strains and a shell applied to the exterior surface of the frame to give external appearance to the body. The present invention comprises an automobile body having such a skeleton frame and shell and constructed by connecting together a number of sub-assembly units in the final assembly; for instance, a pair of side panel units are connected at their rear ends by a tonneau frame unit and the tonneau panel is mounted on the latter unit. These different sub-assemblies may be fabricated as independent units, brought to the final assembly and there united to form the automobile body. My invention contemplates a tonneau frame unit joining the side panel units, which frame unit may well include a cross member and door posts in line therewith. My invention also contemplates side panel units each including a body sill, at least one door post and a toe-board support carried thereby, and a metal shell applied thereto. Another aspect of my invention contemplates a tonneau made up of a tonneau panel and wheel housings secured thereto, said parts being braced and reinforced by braces extending between the tonneau panel and the wheel housings. My invention also contemplates an improved mounting in the door post for a rubber buffer.

In general, I carry out the objects of my invention by providing an automobile body construction formed by uniting a number of sub-assembly units in the final assembly. In one embodiment of my invention, the sub-assembly units comprise left and right side panel units, a tonneau unit, a cowl unit, a tonneau frame unit and a front seat unit. These sub-assembly units are fabricated independently and then brought to the final assembly, where they are joined together, for instance, by electric welding. It is to be understood that, after the final assembly, the body may go through the usual finishing operations, such as mounting the doors, attaching the lock keepers, etc.

I provide a very strong tonneau construction by connecting together the contiguous edges of wheel housings and a tonneau panel and bracing them by top-iron supports which connect such parts together. The tonneau frame unit, in this embodiment, comprises the rear door posts, rear seat support and the rear cross member, which, in this instance, is in line with the rear door posts. This unit is mounted within the tonneau and reinforces it against shocks and strains, providing a very strong construction at this point.

As I have already stated, this automobile body is made up of a skeleton frame which takes the stresses and strains, and to which a shell is applied which gives the external appearance to the body, the shell being formed to the desired contour and curvature to give the body lines which may be preferred.

In this particular embodiment of my invention, the skeleton frame is made up of two body sills, 35, which extend longitudinally along the lower portions of the sides of the body. Four door posts are rigidly connected to each of these body sills at points determined by the location of the doors. It is customary to refer to these door posts as "A", "B", "C", and "D" posts, respectively, starting from the front of the body, and we shall use this terminology to designate the different door posts. The "A" posts, 50, are mounted on the body sills, towards the front end thereof and in line with the forward edge of the front door. The "B" posts, 46, are mounted on the body sills in line with the rear edge of the front door and are each provided with a stop portion co-acting with the door, 16. The "C" posts, 44, are mounted on the body sills in line with the forward edge of the rear door and each has a stop portion co-acting with the free edge of the rear door, 15. The "D" posts, 90, which, in this instance, may form part of the tonneau frame unit, (Figs. XX, XXI, and XXII) are connected to the body sills in line with the rear edge of the rear door and the forward edge of the tonneau. The rear ends of the body sills, 35, are connected by the tonneau frame, which is made up of tonneau side sills, 82, the tonneau rear sill, 86, and the front cross member 89. These parts are connected to make a frame work which is positioned within the lower portion of the tonneau, reinforcing it, and which frame work also forms a transverse connection between the rear ends of the body sills. The cross member, 89, is substantially in line with the "D" posts, 90, which are mounted directly on said frame. A rear seat support is mounted upon the tonneau frame, as will be described hereinafter. A toe-board support, 65, is mounted on the forward end of each body sill, in advance of the "A" door post. A front seat unit is mounted between the body sills in line with the portions thereof between the "B" and "C" door posts, 46 and 44, and comprises the curved seat back, 134, the bottom seat pan, 131, and the heel board, 139. These parts are connected together as will be described in greater detail hereinafter, and form a transverse brace or cross member, connecting the body sills, 35, at this point. An external shell of the desired curvature and contour is applied to this skeleton frame and secured thereto, for instance, by welding. This shell is applied to the frame in sections, the cowl section or panel embracing the "A" door posts, 50. This cowl panel forms an efficient connection between the forward ends of the body sills. Side panels, 53, are applied to the body sills, 35, and the frame work made by the "B" and "C" door posts, 44, and 46, so as to cover that portion of the skeleton frame between the front and rear doors and adjacent to the lower portions of such doors. The tonneau, made up of the tonneau panel, 12, and the wheel housings, 13, has the usual curved back and forwardly extending side portions which extend to and are connected to the "D" door posts, 90, and the rear ends of the body sills, 35. As I have already indicated, this body is made by uniting in the final assembly a number of units which are fabricated as independent units and brought together in the final assembly. In order to bring out this feature of my invention clearly, I will describe the independent units and then point out how they are joined together to form the complete body.

In the drawings, I have shown an automobile body, constituting one embodiment of my invention, and comprising a cowl, 10, side panels, 11, and a tonneau, 12. The upper portion of the tonneau overhangs the wheels slightly and I provide the wheel housings, 13, as shown, which are fastened to the tonneau panel and constitute the lower side portions of the tonneau. The body portions of these wheel housings are set inwardly of the automobile body, so as to provide the proper clearance for the wheels. The front seat, 14, is mounted between the side panels, as will be described hereinafter, between the rear doors, 15, and the front doors, 16. The rear doors, 15, are hung upon the hinges, 17 and 18, and the front doors, 16, are hung on the hinges, 19.

The fenders, 20, are secured to the tonneau by the means which I will now describe. The lower side portions of the tonneau panel, 12, are provided with the curved, laterally extending flange, 21, adjacent the points of connection with the wheel housing. The upper portion of the wheel housing is provided with a curved, laterally-extending flange, 22, which lies above the flange, 21, of the tonneau panel, and with a vertically extending flange, 23, which lies against the inner face of the tonneau panel, 12. These overlapping portions of the tonneau panel and the wheel housing are secured together in any suitable manner, as, for instance, by riveting or welding. The inner edge of the fender, 20, extends beneath the flange, 21, of the tonneau panel and is rigidly secured to the tonneau as by bolts or rivets, 24, extending through the flanges, 21 and 22. It will be observed that this provides a very strong and rigid connection between the tonneau panel and the wheel housing. The overlapping flanges, 21 and 22, are not only firmly connected, but the flange, 23, also abuts the side wall of the tonneau panel and aids in keeping the wheel housing correctly positioned and braced. The fender, or mud guard, is attached at this point and this construction reinforces the tonneau so that it is not so likely to be distorted when the fender is struck by a lateral blow, as in a collision. The tonneau is further braced, and the tonneau panel and the wheel housing are connected together, so as to make a very strong and durable construction, by means of the braces, 25, which may, if desired, be provided with a strengthening rib. The lower ends, 26, of these braces are joined to the wheel housing, 13, as by the rivets, 28, and the upper ends, 27, of these braces are secured as by rivets, 30, to the vertically extending stiffening flange, 29, at the upper edge of the tonneau panel. These braces serve, therefore, to reinforce the tonneau and brace the tonneau panel and the wheel-housings relative to each other, and also as supports for the top iron on which the automobile top is mounted in the usual manner. As shown, the rivets, 30, also fasten to the brace, 25, the member, 31, having an opening, 32, in line with the hole, 34, in the tonneau panel, through which the top iron extends from the outside to the inside of the body.

Each side unit comprises one side of the skeleton frame and that part of the body shell forming the side of the body between the doors and below the thresholds thereof. Each unit, therefore, forms one side wall of the body from the rear edge of the rear door to the front edge of the front door. In general, the side panel unit includes the body sill, such door posts as are mounted on the body sill, and the side portions of the body shell. In Fig. VI and Fig. VII, I have shown a top plan view and a view in side elevation, respectively, of the left hand side panel unit. The right hand side panel unit corresponds to this. In this embodiment, the side panel unit comprises the body sill, 35, having the horizontally extending flange, 37, which extends the length of the sill. The sill is provided, towards its rear end, with the curved laterally extending flange, 36, forming a threshold for the rear door and, towards its front end, with the curved laterally extending flange, 42, forming a threshold for the front door. The portion, 40, of the body sill, between these last mentioned flanges, forms a support for the side panel between the doors and is curved and inclined as determined by the curvature of the body. Holes, 41, may be formed in this portion to lighten it, if desired. At its rear end, the sill, 35, is bent laterally forming the flange, 39, which is curved and abuts the flange, 22, of the wheel housing, 13, when the parts of the body are assembled. From this flange there extends rearwardly the enlarged flange, 38, which overlaps and is secured to a part of the tonneau frame in the final assembly.

The "C" door post, 44, is of channel cross-section, as shown in Figs. IX and X, and has the ledge, 45, formed therein, which serves as a stop for the free edge of the rear door, 15. The foot of the door post, 44, seats on the flange, 37, of the body sill, the outer face of the post, 44, fitting against the inner surface of the part, 40, of the body sill and being secured thereto in any suitable manner, as, for instance, by electric welding. It is to be understood that the post is inclined upwardly, as shown, at an angle and curvature determined by the body lines. The portion of the post forming the ledge, 45, is pressed back, as shown in Fig. VII, at 45′, forming a recess in which the latch keeper is riveted. The "B" door post, 46, is also of channel cross section and provided with a ledge, 47, which forms a stop for the free edge of the front door, 16. These "B" and "C" door posts, 46 and 44, are substantially alike and are secured to the body sill in substantially the same manner. The "B" door post also has a portion of the ledge, 47, pressed in to receive the latch keeper. A U-shaped member, 48, is mounted within the channel of the door post, 46, as shown in Figs. VII and X, the upper portion of said U-shaped member being reduced in size, so as to receive the end of a cross member between it and the sides of the door post. An angle bar, 49, has its ends, 49′, offset and welded to the posts 44 and 46, as shown in Fig. XXXVII. This angle bar forms a support for one end of the front seat and also connects the "B" and "C" door posts and braces them relative to each other.

The "A" door post, 50, is of channel cross section and is mounted on the body sill, 35, with its base resting on the flange, 37, and secured to the sill in any suitable manner. A laterally extending curved flange, 43, is formed on the body sill, as shown in Fig. VII, being spaced from the flange, 42, just enough to accommodate the door post, 50. The flanges, 42 and 43, thus serve to brace the "A" door post very effectively against strains longitudinally of the body. A hinge plate, 51, is fastened to one wall of the door post, 50, as shown in Figs. VII and XI, and is provided with a pair of hinge boxes, 52, in which the pintles of the hinges, 19, are mounted, in the usual manner.

The parts which I have just described constitute the portion of the skeleton frame of the body, which reinforces and supports the side panel. This side panel, 53, is applied to the frame, being provided with a laterally extending flange, 54, which is disposed beneath the flange 37, of the body sill, as shown in Fig. VIII. At the rear end, the side panel, 53, is bent laterally, at 55, over the flange, 39, of the body sill, as shown in Fig. XXXVI being interposed, in the assembled body, between the flange, 39, and the flange, 22, of the wheel housing. The body sill has an upwardly extending plate, 56, secured to it at this point, and connected to the "D" door post in the final assembly. A curved, laterally-extending flange, 57, is bent from the side panel, 53, over the curved threshold flange, 36, of the body sill, as shown in Fig. VIII. The side panel, 53, extends upwardly at 58, covering the portion, 40, of the body sill and the "B" and "C" door posts, 46 and 44. This portion, 58, of the panel has the flange, 59, which is bent around the door post, 44, to the stop, 45, and the flange, 60, which is bent around the door post, 46, to the stop, 47. This portion, 58, of the body panel extends to the top of the door posts and has a bead, 61, at its upper edge, terminating in the inturned flange, 62, as shown in Fig. XXXV. On the top of this flange, 62, there is mounted the garnish rail, 63, which forms a continuation of a similar rail mounted on the front seat back, and in which a tacking strip may be fastened for attaching the upholstery. The body panel, 53, extends in front of the portion, 58, nearly to the "A" door post and is provided with a curved, laterally-extending flange, 64, which is bent over the flange, 42, of the body sill.

The forward end of the body sill is curved laterally in conformity with the body curvature at the cowl and a toe-board support, 65, is mounted on the flange, 37, of the body sill, at the extreme forward end thereof. This toe-board support may well be of substantially triangular formation, having a laterally extending flange, 66, along its upper edge, inclined upwardly towards the front end of the body. The toe-board support may also have a lower horizontal flange, 67, which rests on the flange, 37, of the body sill, and a laterally-extending flange, 68. The flanges, 66, 67, and 68, add considerable strength to this member and it may also be corrugated, if desired, so as to add strengthening ribs. The extreme forward end of the body sill may have a flange, 69, bent around the lower part of the toe-board support, as shown in Fig. VII.

I have described the left hand side panel unit and it will be understood that the right side panel unit corresponds to the left hand unit. When these two parts are connected in the complete assembly of the body, they constitute the sides of the body. The toe-boards rest upon the inclined flanges, 66, of the toe-board supports carried by the forward ends of the body sills, 35. Suitable bolt holes, such as 70, 71, 72, and 73, may be formed in the flange, 37, of the body sill through which the attaching bolts may pass for fastening the complete body upon the chassis frame.

The tonneau unit forms the rear end of the body and, in general, comprises that portion of the body shell at the rear of the body and forming the sides and back of the rear seat. The tonneau unit assists the tonneau frame in connecting together the rear ends of the side panel units and, with the tonneau frame, forms the rear seat of the body. In Figs. XIII, XIV and XV, I have shown the tonneau unit. In this embodiment, it comprises the tonneau panel, 12, which is curved in conformity with the curvature of the rear portion of the body and extends forwardly to the rear edges of the rear doors. A bead, 74, is formed at the upper edge of the tonneau panel, 12, and it is provided with a laterally-extending flange, 75, and a vertical stiffening flange, 29, adapted to receive a garnish rail for attaching the upholstery. A flange, 76, extends forwardly from the lower edge of the rear portion of the tonneau panel, 12, and the tonneau panel is bent laterally at its forward edges forming the flanges, 77, which are bent around the "D" door posts. Each flange, 77, has an opening, 78, cut therein to accommodate the hinge, 17, by which the rear door is mounted on the "D" door post. The lower side portions of the tonneau panel, 12, are cut away, adjacent the wheels of the vehicle, and the tonneau panel is provided with flanges, 21, as already described, at these points. The wheel housings, 13, are secured to these flanges, as already described, each wheel housing being provided with a laterally-extending flange 81, along its lower edge.

The tonneau frame unit reinforces the tonneau unit and, with the latter, connects the rear ends of the side panel units and furnishes a support for the rear seat. This unit comprises, generally, a framework connecting the rear ends of the body sills and fitting within the lower portion of the tonneau unit. The tonneau frame unit used in this particular embodiment of my invention is illustrated in Figs. XX to XXIII, inclusive. This tonneau frame unit reinforces the tonneau, serves as a connecting member between the rear ends of the body sills and may also carry the support for the rear seat. I have found the construction shown to be very efficient, in which there are the two tonneau side sills, 82, each of which has the lower flange, 83, and the upper flange, 84, said flanges extending inwardly of the automobile body. The front end of the outer face of each side sill may be inset slightly, as at 85, forming a wide vertical web having a surface to which the rear end of the corresponding body sill may be fastened, as described hereinafter. The rear ends of the side sills, 82, are connected by the tonneau rear sill, 86, which may also have the upper and lower inwardly extending flanges, 88, and 87, respectively. The front ends of the sills, 82, are connected by the cross-member, 89, which may well be of channel-shaped cross-section.

The "D" door posts, 90, which may also be of channel cross-section, have their lower ends securely fastened to the side sills, 82, substantially in line with the cross-member, 89. These "D" door posts, 90, carry the hinge boxes, 91, in which the upper hinges, 17, for the rear doors are mounted.

The seat pan, 92, which may well be corrugated for strength, rests, at its sides, on the flanges, 84, of the side sills and, at the rear, on the flange, 88, of the rear sill, and may be secured to such sills in any desired manner. The rear portion of the seat pan may be pressed up into a different plane from the body of the seat pan so as to form the rear seat support, 94, provided with the flange, 95, along its rear edge. The front portion of the seat pan, 92, is bent downwardly, forming the vertical flange, 103, then forwardly, forming the horizontal flange, 104, and then downwardly, forming the channel-shaped flange, 105, the ends of which are supported by the lower flanges, 83, of the tonneau side sills. The heel-board, 107, has a flange, 106, at its lower edge, which rests on the flange, 104, of the seat pan. The upper portion of the heel-board is bent forwardly, forming the flange or shoulder, 108, and then upwardly, forming the retaining flange, 109.

The forward support, 101, for the rear seat rests on and is secured to the heel-board flange, 108, and has the shoulder, 102, at its rear edge. The side seat-supports, 96, are supported on the rear and front seat-supports, 94 and 101, respectively and each has a retaining flange, 97, and the shoulder, 98, at its inner edge. The forward and rear seat supports may be connected by a strip, such as the strip, 99. In some cases, I have found it desirable to insert a brace, 100, between the central part of this strip and the seat-pan. It will be observed that a compartment is formed by the seat-pan and the seat-supports, suitable for storing the storm curtains, for instance. Such compartments are usually closed by wooden covers and the shoulders, 98 and 102, and similar shoulders on the rear seat-support, 94, and strip, 99, are provided to receive the edges of such covers. The angular gusset plates or stampings, 110, are fastened to the heel-board, 107, and the "D" door posts, 90, and brace the door posts. The rear floor plate, 111, is supported at its rear edge, on the flange, 106, of the heel-board and, near its front part, on the cross-member, 89. The forward edge of this floor plate is flanged, at 112, to receive the edge of the wooden floor boards usually employed. The clips, 113, may be used to retain such floor-boards in place. The brace, 79, is secured at its lower end to the rear sill, 86, and extends upwardly therefrom at a curvature and inclination determined by the contour of the rear of the tonneau panel. The upper end of this brace is connected to the upper edge of the tonneau panel, 12, and it serves to strengthen and reinforce the tonneau. The brace, 79, may carry a boss, 80, extending through the panel and adapted to receive the bolt for attaching a tire carrier, for instance.

The forward ends of the side panel units are connected by a cowl unit which, in this instance, includes that portion of the body shell in front of the front door opening and such parts and members associated therewith as to strengthen and reinforce the cowl panel so that it will form an efficient connection between the front ends of the side panel units, keeping them properly spaced with reference to each other. I have found it desirable also, in many cases, to provide means for supporting a wind shield from this cowl panel and, also, for mounting an instrument board on said panel. I have found that a cowl pan connected to the forward edges of the cowl panel makes a very effective means for stiffening and reinforcing the cowl unit. This also provides means for carrying a toe-board retaining strip.

In this specific embodiment of my invention, I have employed a cowl unit comprising a cowl panel, 114, in the forward portion of which the ledge, 115, is formed, which ledge is adapted to form a seat for the rear edge of the hood of the automobile. The extreme forward portion of the ledge, 115, is pressed down forming the flange, 117, to which the edges of the cowl pan, 116, are secured. The strip, 118, having the shoulders, 119, may be secured to the cowl pan and forms a retaining strip engaging the front edge of the toe-board. In the motor vehicle for which this particular body is produced, the rear end of a radiator stay rod is connected to the cowl pan, and I prefer to apply a reinforcing disc, 120, to the cowl pan at the point where said stay rod is connected. The rear upper edge of the cowl panel, 114, is bent, at 122, around the stiffening bar, 121, which is normally disposed beneath the lower edge of the wind shield. The rear side portions of the cowl panel are bent inwardly forming the flanges, 123, by which the panel may be secured to the "A" door posts. These flanges may have notches, 124, therein to accommodate the hinges, 19, for the front door. The lower portions of the cowl panel are bent inwardly forming the flanges, 125, by which the cowl unit may be connected to the body sills. The flanges, 123, may also be continued in the curved flanges, 126, which are bent over portions of the body sill flanges, 42, and complete the front door threshold.

I may also provide the supports, 127, for the instrument board (not shown). These supports may have the vertically extending shoulders, 128, to which the ends of the instrument board may be secured. One end of each support may be offset rearwardly abutting the adjacent door post, 50. I may also mount on these supports sockets, 130, for receiving the wind shield stanchions.

The front seat unit comprises the front seat support and the front seat back. This unit is to be connected between the side panel units and is so constructed that it also constitutes a central cross member between the body sills. The front seat unit for the embodiment of my invention, which I have described, is illustrated in Figs. XXIV to XXVII, inclusive. This embodiment of the unit comprises a seat pan, 131, which may be corrugated so as to strengthen it. At the front and rear edges of the seat pan are formed vertical flanges in which the horizontal shoulders, 133 and 132, are formed. The front seat back panel, 134, is curved to give the desired shape to the back. It may have a stiffening bead, 135, formed therein and may also have a groove, 136, formed therein, in which a tacking strip may be mounted. The seat back panel may have a horizontal shoulder, 137, pressed therein (see Fig. III), on which the rear support for the front seat rests. A horizontal flange, 138, formed on the lower edge of the seat back panel, rests on and may be secured to the shoulder, 132, of the seat pan. The heel-board, 139, has a flange, 140, at its lower edge, which rests on and may be secured to the shoulder, 133, of the seat pan. At the upper edge of the heel-board, I find it convenient to form the flange, 141, on which the retaining strip, 143, may seat. The retaining strip may be provided with a flange, 144, which is disposed behind the upper portion of the heel-board. The heel-board may be provided with the wings, 142, extending along the sides, as shown in Fig. XXVI, and giving a finished appearance to the parts of the front seat which are visible through the openings for the front doors.

An angle bar cross member, 145, supported at its ends on the U-shaped members, 48, of the side panel units, is used in this embodiment to assist in supporting the front seat. In this case, this bar is loosely mounted in the front seat unit and is secured in place in the final assembly.

The seat support, 147, is seated on the flange or shoulder, 137, and has the retaining flange, 148, at its rear edge. The front seat support rests on the horizontal shoulder of the retaining strip, 143. The side seat supports, 149, rest on and are secured to the front and rear supports and may be provided with the marginal retaining flanges, 150. The front and rear supports, in some cases, may be connected by the strip, 146, and I may also form shoulders, 158, on the inner edges of the seat supports and the strip, 146, to receive the edges of the covers for the compartment formed in the front seat unit.

The side portions of the front seat back panel, 134, may well have the lateral flanges, 151, formed therein, which flanges are fastened in the final assembly to the "C" door posts. An angular stiffening flange may be formed on the upper edge of the panel, 134, provided with the horizontal portion, 152, and the vertical portion, 153, and supporting the garnish rail, 154.

In Figs. XXVIII to XXXI, I have shown an anti-rattler construction which I have used with this body. This construction costs very little and the rubber buffer can be mounted in place very quickly and expeditiously. I provide an opening or seat in the door post, or similar part, in which the rubber buffer is seated and retained in place, so as to project slightly from the surface of the door-stop.

In the particular embodiment of my invention, which I have illustrated, the door post, 46, has a portion of angular cross section forming the stop shoulder, 47. An opening, 159, is formed in the angular portion of the post, and a plate, 155, having a convex seat, is secured to the door post behind the opening, 159. A cylindrical rubber buffer, 156, is inserted in the opening, 159, and seats against the plate, 155. This buffer has the longitudinally extending portions, 157, at its ends, which are inserted behind the angular portion of the door post above and below the opening to retain the buffer in place. The rubber buffer may be distorted so as to insert it in the opening and allow the end portions to lodge behind the angular portions of the door post when the buffer resumes its normal position. In Fig. XXXI, the door is shown in dotted lines in closed position and it will be understood that the rubber buffer is compressed and distorted from its normal shape when the door is closed.

In the final assembly, the various sub-assembly units are joined together to form the complete body. For instance, in the particular construction which I have described, the rear ends of the side panel units are connected to the forward corners of the tonneau frame unit, the tonneau unit is mounted on and secured to the tonneau frame unit and the rear portions of the side panel units, the cowl unit is connected to the forward ends of the side panel units, and the front seat unit is mounted between and connected to the side panel units. In the body construction illustrated and described, I have provided certain means for connecting the units together which have proven very efficient and satisfactory in practice. The portions, 38, of the body sills are disposed so that they overlap the portions, 85, of the tonneau side sills and are secured thereto. This may be done very satisfactorily by electric welding. The plates, 56, on the body sills, may also be connected, for instance, by electric welds, to the "D" door posts, 90. In this manner, the side panel units and tonneau frame unit may be effectively connected together. The tonneau unit is mounted on the tonneau frame unit with the flanges, 81, disposed beneath the flanges, 83, of the tonneau side sills and the flange, 76, beneath the flange, 87, of the tonneau rear sill. These flanges may be secured together very efficiently by electric welding. The flanges, 77, of the tonneau unit lie in front of the "D" door posts, 90, and may be secured to the forward faces of such posts, for instance, by electric welding. The cowl unit may be mounted on the forward ends of the side panel units with the flanges, 125, disposed beneath and secured to the flanges, 37, of the forward ends of the body sills and the flanges, 123, abutting and secured to the rear faces of the "A" door posts, 50. These parts may well be secured together by electric welding. The supports, 127, for the instrument board are so located that the flanges, 129, thereof may be secured to the forward faces of the door posts, 50. The front seat unit is positioned between the central portions of the side panel units, the ends of the seat pan, 131, resting on and being secured to the flanges, 37, of the body sills. The side seat supports, 149, are supported by the angle bars, 49, of the side panel units and the cross member, 145, also aids in supporting these parts. The flanges, 151, of the seat back panel may be secured to the "C" door posts, 44, for instance, by electric welds.

The independently fabricated sub-assembly units may be united in the final assembly, as I have described. After the final assembly, there may remain certain operations before the body is complete. For instance, the sill covers, 160 and 161, may be applied to the body sills at the rear and front doors, respectively. These stampings serve as covering stampings to give a smoother finish and have shoulders, 163, pressed therein and cooperating with the shoulders, 112, 138 and 140, to support the floor boards. The braces or top supports, 25, may be fastened in position, the lock keepers mounted in place and the doors hung after the final assembly.

The body which I have specifically described here, constitutes one embodiment of my invention, but I realize that other embodiments may well be made which would fall within the scope of my invention. The tonneau construction which I claim in this application is not necessarily dependent on the unitary construction by the assembly of various units, and, hence, I claim this tonneau construction without limiting it to the other features of construction described. The same is true of the anti-rattler construction.

I am aware that the particular embodiment of my invention, which I have described here, is susceptible of considerable variation without departing from the spirit of my invention and, hence, I claim my invention broadly, as indicated by the appended claims.

Having thus described my invention, what I claim as new and desire to secure by Letters Patent is:

1. A unit assembly construction for automobile bodies comprising an endmost unitary sub-assembly terminating substantially in the vertical transverse plane of the endmost door posts, and an adjoining unit joined thereto in said plane through complemental joint parts on the respective units, said joint including one of said door posts.

2. A unit assembly construction for automobile bodies comprising an endmost unitary sub-assembly terminating substantially in the vertical transverse plane of the endmost door posts and embodying an endmost door post and provided with a way extending from the inner terminus of said sub-assembly beyond the plane of said post, and an adjoining unit embodying a sill extending into the way of the endmost unit and making a final assembly joint therewith including the base of said door post.

3. A unit assembly construction for automobile bodies comprising an endmost unitary sub-assembly terminating substantially in the vertical transverse plane of the endmost door posts and flanged inwardly at the bottom and an adjoining unit embodying a sill adapted in final assembly to nest within and make a longitudinally extending final assembly joint with the bottom flanged-in portion of the endmost unitary sub-assembly.

4. A sub-assembly unit construction for sectional automobile structures comprising a series of self-sustained unitary sections joined together in longitudinal series through final assembly unit joints effected through the embodiment of complemental joint parts upon door posts erected in sub-assembly upon the one section and finding their complements in means provided on the next adjoining section.

5. A sub-assembly unit construction for automobile body structures comprising a unitary cowl sub-assembly embodying at its rear edge a vertically extending complemental portion of the final assembly joint, together with an adjoining unitary unit embodying a body side sill extending into the cowl sub-assembly in the final assembly and having a vertically extending final assembly joint element having surfaces complemental to the vertically extending final assembly joint construction of the cowl unit adapted to be nested with the cowl unit construction and joined thereto in final assembly.

6. A unit assembly automobile body comprising a cowl terminating in a transverse plane and having parts forming final assembly joints in said plane, and independently assembled and separate opposite side frame units including body side sills having their fore ends formed as mating parts of said final assembly joints.

7. A unitary cowl sub-assembly unit adapted to enter a sectional automobile body structure comprising a cowl body panel adapted to extend from sill to sill of the body and overlap the same laterally and having inturned flanges at its lower and rear edges, the latter of which terminate short of the flanges on the lower edges whereby there are formed ways opening rearwardly adapted to receive within the body of the cowl unit the projecting fore ends of the next adjoining portion of the body to make final assembly joints therewith.

8. In an automobile body structure, a tonneau unit comprising side sills provided with enlarged vertical webs at their front ends, and a body fore structure embodying side sills having correspondingly enlarged vertical webs joined to the enlarged vertical webs of the tonneau unit.

9. A unit sub-assembly construction for automobile bodies comprising a unitary sub-assembly tonneau structure extending from a tonneau rear door post on one side of the body to a rear tonneau door post on the opposite side of the body and making final assembly joints with an adjoining unit structure substantially at the base of a door post, the post forming a part of the joint.

10. An endmost sub-assembly unit adapted to enter a sectional automobile body structure comprising a main body embodying an endmost door post and body paneling each having portions formed to constitute a complemental part of a final assembly unit joint to an intermediate unit of the sectional structure.

11. A sub-assembly unit construction for a sectional automobile body structure comprising a unitary tonneau section embodying a wheel housing structure and a unitary adjoining section, which sections are joined together by a terminal formation having a horizontal cross section, corresponding to a similar section of the wheel housing and joined to a vertically extending door post.

12. A sub-assembly unit construction for sectional automobile body structures comprising an endmost unit and an adjoining unit, one of which units embodies in sub-assembly an endmost door post and has its adjoining terminal end formed as a complemental part of a final assembly unit joint, and the other of which units embodies an oblique brace between the threshold of the door and the said door post.

13. A sub-assembly unit construction for sectional automobile structures comprising a unitary tonneau embodying a tonneau side sill and an adjoining body unit embodying a main body side sill which units are joined together by a joinder of the sills at the base of the rearmost door post and independently of the threshold.

14. A sub-assembly unit construction for sectional automobile structures comprising a unitary sub-assembly having an inner frame structure and an outer paneling secured thereto, together with an adjoining unit having a frame structure interleaved between the frame structure of said sub-assembly and its paneling to constitute a final assembly unit joint therewith.

15. In an automobile body structure, in combination, a tonneau unit having a wheel housing, a door post adjoining the wheel housing and a main body side sill having an end joined to the wheel housing and the post and shaped in continuation of each of said parts.

16. A joint construction comprising a pressed metal member having a vertically extending inwardly presenting channel member adapted to constitute the base of the door post and an inwardly and rearwardly projecting extension from its rear side wall conforming in contour to a continuation of the tonneau wheel housing.

17. A sub-assembly unit construction adapted to enter a sectional automobile construction comprising a cowl unit extending from front door post to front door post, an intermediate structure embodying main body side sills having their fore ends telescoped within the cowl structure and constituting final assembly unit joints therewith, and having their rear ends formed as complemental parts of final assembly unit joints with a tonneau structure, and a tonneau structure extending from rear door post to rear door post and having its front lower ends formed as complemental parts of the final assembly joints into which the rear ends of the main body side sills enter.

18. A sub-assembly unit construction adapted to enter a sectional automobile structure comprising a unitary cowl sub-assembly extending transversely of the body from front door post to front door post and embodying rearwardly opening ways in its lower sides, a pair of independently assembled side units embodying main body side sills making final assembly unit joints by their front ends in the ways of said cowl unit, and a unitary sub-assembly tonneau structure joined by final assembly joints with the respective rear ends of said side units.

19. An automobile body comprising side panel units each including a body sill, and a door post carried thereby; a tonneau frame unit connecting the rear ends of said side panel units and including a transverse cross member and door posts in line therewith, and a tonneau unit applied externally to said tonneau frame unit.

20. An automobile body comprising side panel units each including a body sill, and a door post; a tonneau frame unit, including side sills and cross-members, connected at its forward corners to the rear ends of said body sills, and having door posts in line with said front corners, and a tonneau unit applied externally to said tonneau frame unit.

21. An automobile body comprising side panel units each including a body sill, and a door post carried thereby; a tonneau frame unit connecting the rear ends of said side panel units and including side and rear sill members and a cross member; a seat support carried by said sill members, and door posts secured to said side sill members in line with said cross member, and a tonneau unit applied externally to said tonneau frame unit.

22. An automobile body comprising side panel units, each including a body sill, and a door post carried thereby; a tonneau frame unit to strengthen and reinforce the tonneau unit connected to the rear ends of said body sills and including door posts; and a tonneau unit applied externally to said tonneau frame unit.

23. An automobile body comprising side panel units each including a body sill, a door post and a toe-board support carried thereby, and a metal shell applied externally thereto; a tonneau frame unit connecting the rear ends of said body sills; a cowl unit connecting the front ends of said body sills; and a tonneau unit applied externally to said tonneau frame unit.

24. An automobile body comprising a pair of side panel units each including a body sill, a door post carried thereby, and a metal shell applied externally thereto, a tonneau frame unitary assembly including side and rear tonneau sills connected to the rear ends of said side panel units, and a tonneau panel unitary assembly applied externally to said tonneau frame assembly completely embracing the same.

25. In an automobile body, a front seat unit, including a sheet metal panel formed to the curvature of the back and sides of the seat and a seat pan secured to the lower edge of said panel, and a pair of side panel units, each including a sill member, the ends of said seat pan being supported on said sill members.

26. A sub-assembly unit construction for automobile bodies comprising a pair of side sub-assembly units embodying unbroken front and rear threshold portions, and a unitary front seat sub-assembly structure embodying a sub-assembled seat bottom and a seat back making final assembly unit joints with said side sub-assembly units intermediate said front and rear threshold portions of the side units.

27. An automobile body comprising side panel units, each including a body sill, a door post and a toe-board support carried thereby, and a metal shell applied externally thereto; a tonneau frame unit connecting the rear ends of said body sills; a cowl unit connecting the front ends of said sills; a front seat assembly unit connected to said side panel units midway thereof and forming a transverse brace, and a tonneau panel applied externally to said tonneau frame unit.

28. A unit assembly construction for automobile bodies, comprising independently assembled body end units terminating intermediately of the body substantially in the transverse plane of the respective endmost door posts, together with an independently assembled intermediate unit embodying a door sill member and intermediate door posts erected thereon, which said intermediate unit is as a unit joined to the respective end units substantially in the transverse planes of the endmost door posts, and a unitary front seat subassembly embodying a seat and connected seat back panel making final assembly joints with said intermediate unit through both the door sill member and door posts.

29. In an automobile body, a front seat unit including a sheet metal panel stamped to the curvature of the back and sides of the seat, said panel having a shoulder at its lower portion, and a seat support resting on said shoulder.

30. In an automobile body, a front seat unit including a sheet metal panel formed to the curvature of the back and sides of the seat, a seat pan secured to the lower edge of said panel, a heel board secured to the forward edge of said seat pan, and a seat supporting structure supported by said panel and heel board.

31. An independently assembled unit for automobile bodies comprising a sheet metal panel pressed to the desired contour to form the back of a seat and provided with vertical edges at the forward ends thereof, said panel having portions projecting forwardly from the upper ends of said edges.

32. In an automobile body, a tonneau frame unit including longitudinally extending side sills, the upper edges of said side sills having inturned flanges, cross members connecting said side sills, and a seat pan supported upon said inturned flanges.

33. In an automobile body, a tonneau frame unit including longitudinally extending side sills, cross members connecting said side sills, and a seat pan supported at its ends upon the upper edges of said side sills, the rear edge of said seat pan having an upturned flange.

34. A unit assembly construction for automobile bodies comprising a unitary tonneau frame assembly extending transversely of the body as a unitary assembly from a doorway opening on one side to a doorway opening on the opposite side and making final assembly joints with an adjoining unit in substantially the transverse plane of the rear edges of said door openings, together with a unitary panel assembly structure for said transverse tonneau unit making final assembly unit joints with said tonneau frame on its perimetral margins.

35. In an automobile body, a tonneau frame unit comprising a pair of body side sills each including an inwardly extending bottom flange, a rear body sill connected to the side sills and having a forwardly extending upper flange, and a seat pan having a forwardly extending flange resting upon and secured to said inwardly extending bottom flanges and a rearwardly extending flange resting upon and secured to the forwardly extending upper flange of said rear body sill.

36. In an automobile body, a tonneau frame unit comprising a pair of body side sills each including an inwardly extending bottom flange, an inverted channel cross member resting upon said bottom flanges and secured thereto, a seat pan disposed rearwardly of said cross member and also secured to said bottom flanges and having a forwardly extending support disposed substantially in the plane of the base wall of said cross member, and a member resting upon said support and said base wall whereby to constitute the rear portion of the tonneau floor board.

37. As an article of manufacture, a sub-assembly side frame unit embodying that section of the side sill extending from the fore part of the cowl to the rear door tonneau post, a toe-board support joined to the fore end of said sill, and a tonneau door post re-enforcing bracket joined to the rear end of said sill together with a front door post joined to the sill at an intermediate location, which said unit makes unit joints with the adjoining units through said toe-board support and front door posts at one end and through said reenforcing bracket at the other end.

38. A sub-assembly intermediate unit adapted to enter a sectional automobile body construction comprising a body side sill having a terminal end provided with a vertically extending column section and a rearwardly extending portion from said column section constituting complemental parts of a final assembly unit joint.

39. In an automobile body, the combination of a tonneau panel having a stiffening flange at its upper edge, a wheel housing secured along one edge to said tonneau panel and having a side wall offset from said edge and a brace secured at its upper end to said stiffening flange and, at its lower end, to said wheel housing.

40. In an automobile body, the combination of a tonneau panel having its lower side portions cut away, wheel housings secured at the edges of said cut away portions to said tonneau panel and having their side walls offset inwardly of the automobile body, and a plurality of braces secured at their lower ends to said wheel housings and at their upper ends directly to said tonneau panel.

41. In an automobile body, the combination of a tonneau panel, a wheel housing secured to said panel and offset inwardly of the automobile body, and a plurality of top iron supports secured directly to said panel and the offset portion of said housing and bracing said parts relative to each other.

42. In an automobile body, the combination of a tonneau panel having a wheel housing including a side wall inwardly offset from the body of said panel, and a brace secured at its lower end to said wheel housing and at its upper end to said panel in a region vertically removed therefrom.

43. In an automobile body, the combination of a tonneau panel having a laterally extending flange at its lower edge, and a stiffening flange at its upper edge, a wheel housing having a laterally extending flange at its upper edge overlapping and secured to the said flange on the tonneau panel, a brace connecting the wheel housing and the stiffening flange of the tonneau panel, and a fender having one edge portion disposed beneath said flanges and secured thereto.

44. In an automobile body, the combination of a tonneau panel, a wheel housing, adjacent edge portions of said housing and panel being secured together, a brace extending between the housing and the panel and connected directly to the panel, and a fender connected to and supported by the housing.

45. An automobile body comprising a tonneau having a wheel housing and an inturned lower flange, an angle section tonneau side sill nested in the angle formed by said flange, and a body side sill having an angular section end portion deflected inwardly past the end of said wheel housing and nested with respect to the angle of said tonneau side sill.

46. In an automobile body structure, a body frame including a longitudinally extending frame member having a vertically extending portion offset inwardly, and a tonneau panel correspondingly offset and secured against the said offset surface of said longitudinally extending member.

47. An automobile body comprising a tonneau having a wheel housing and tonneau side sills, and body side sills in overlapping joint relation to said tonneau side sills, one of said sill members having an end part deflected to conform to the contour of said wheel housing.

48. In an automobile body, a sill having a vertically extending web and horizontally extending top flanges together with a door post secured flatwise against said vertical web and projected upwardly through a space between said horizontal flanges.

49. In an automobile body, a sill having a vertically extending web and horizontally extending top flanges, together with a door post connected both to the horizontal flanges of said sill and to the web therebelow.

50. In an automobile body, a side sill having vertically extending webs and horizontally extending top flanges, both of which are vertically extended above the body of the sill at the door post locations, and separately formed door posts connected flatwise against both the webs and the flanges at said locations.

51. In an automobile body a longitudinally extending body side sill having a horizontal and inwardly extending bottom flange adapted to rest upon the supporting structure for said body, an inwardly extending flange on said body sill disposed substantially above the said bottom flange having an upwardly extending flare and a break in the peak of said flare, and a channel member extending upwardly from said bottom sill and having its lower edge resting upon said inwardly extending bottom flange of the body sill and extending through the break in said flared upper flange whereby the flared portions of the upper flange on either side of the upwardly extending channel member constitute integral reinforcing gussets therefor.

52. In an automobile body, a longitudinally extending body side sill including a horizontal and inwardly extending bottom flange, a plurality of door posts mounted upon said bottom flange and secured flatwise against the vertically extending web of said body sill, and an inwardly extending upper flange between said door posts, the intermediate portion of said upper flange being horizontally disposed and the portions of said upper flange adjacent the door posts being curved upwardly from said intermediate portion whereby to form a threshold for the door contoured substantially to the configuration of the lower edge of the door.

53. In a metallic body for vehicles, the combination with a light gaged metallic panel forming the portion of the body between the forward and rear door openings and the threshold of said openings, of a heavy gaged post member of channel section forming a reinforcement, the opening of said channel facing inward of the body and one of the sides thereof having a flange projecting into the door opening to form a stop for the door.

54. In a metallic body for vehicles, the combination with a light gauge metallic panel forming the outer shell of the body, of a heavy gauge hollow post member forming a reinforcement and having one of its side walls formed with a flange projecting into a door opening to form a stop for the door.

55. In an automobile body, a cowl unit having a cowl pan in its front end provided with a transversely extending toe-board support embodying obliquely and downwardly extending steps adapted to receive the forward edge of the toe-board and provided in connection with its lower step with a forwardly extending portion connected with the body of the cowl pan whereby the lower edge of the support is braced from the cowl pan.

56. In an automobile body structure, a channel-shaped frame member, a bracket secured between the side walls thereof and having side portions thereof spaced apart from the side walls of the channel, together with a second channel-shaped member having an end portion of less width than the width of the first named channel secured thereto by the projection of its side walls into the spaces between the sides of said bracket and the sides of the first named channel.

57. In an automobile body, a longitudinally extending sill having a horizontal and inwardly extending bottom flange and the forward portion of said sill being adapted for insertion within the cowl portion of the body, a vertically extending flange at the extreme forward edge of said body sill, and a substantially triangularly formed member mounted upon said bottom flange and secured thereto with one edge thereof abutting said vertically extending flange whereby the hypotenusal edge of said member forms a support for a toe-board.

58. In an automobile body, a longitudinally extending body side sill, an inwardly opening channel door post extending upwardly from said sill substantially intermediate the ends thereof, a U-shaped member mounted within the channel of said door post having its upper portion reduced in size whereby to provide a space between the side walls of the door post and said upper portion of the U-shaped member, and a downwardly opening channel cross member adapted to rest upon said U-shaped member with its side walls disposed in said spaces.

59. In an automobile body, a pair of longitudinally extending body sills each including an inwardly extending horizontally disposed bottom flange, a seat pan resting on and secured to said bottom flanges intermediate the ends thereof, a flange formed integrally on said seat pan and disposed above the plane of said body sill bottom flanges whereby to form supports for the floor boards.

60. In an automobile body, a pair of longitudinally extending body side sills each including a horizontal and inwardly extending bottom flange, a seat pan having the side edges thereof resting upon and secured to said bottom flanges and having a rearwardly extending flange disposed in the plane above that of said bottom flange, a second seat pan disposed rearwardly of said first mentioned seat pan and provided at its forward edge with a supporting shoulder, a member supported upon said shoulder and having a forwardly extending flange in the plane of the rearwardly extending flange of said first mentioned seat pan whereby said flanges constitute supports for the rear floor board of the body.

61. In an automobile body, a pair of body side sills each including a horizontal and inwardly extending bottom flange portion, and a vertically extending portion, an inverted channel shaped cross member secured to said bottom flanges for interconnecting said body sills and having the ends thereof spaced from said vertically extending webs, laterally extending flanges on the free edges of the walls of said inverted channel shaped cross member, and a pair of channel shaped door posts having bottom ends thereof resting upon said laterally extending flanges and embracing the walls of said cross member and the bases thereof disposed within the spaces formed between the ends of said cross member and the vertically extending webs and the bases thereof.

62. An integrally formed sheet metal corner reinforcing plate and toe board bracket for vehicle bodies comprising a vertical web for attachment to the sub-sill of the vehicle and a vertical flange formed on the forward edge of the web at right angles thereto for attachment to the vertical frame member, said web having a downwardly and backwardly inclined upper edge which is turned over to form a supporting ledge for the toe boards.

63. An integrally formed corner reinforcing plate and toe board bracket adapted for ready attachment to and detachment from the corner framework of vehicle bodies comprising a main vertical member integrally uniting a laterally extending corner reinforcing and securing member and a laterally extending toe board supporting member longitudinally inclined to receive and support the toe board in an inclined position.

In testimony whereof, I affix my signature.

JOSEPH LEDWINKA.